(12) United States Patent
Hao et al.

(10) Patent No.: US 10,184,442 B2
(45) Date of Patent: Jan. 22, 2019

(54) PERMANENT MAGNET ELECTRIC MACHINE

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Murali Pandi, Tamilnadu (IN); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 15/158,887

(22) Filed: May 19, 2016

(65) Prior Publication Data

US 2017/0334297 A1 Nov. 23, 2017

(51) Int. Cl.
| | | |
|---|---|---|
| H02K 1/14 | (2006.01) | |
| H02K 1/27 | (2006.01) | |
| F02N 11/08 | (2006.01) | |
| H02K 21/16 | (2006.01) | |
| H02K 7/00 | (2006.01) | |

(52) U.S. Cl.
CPC ......... *F02N 11/0851* (2013.01); *H02K 1/276* (2013.01); *H02K 21/16* (2013.01); *B60L 2220/50* (2013.01); *H02K 7/006* (2013.01)

(58) Field of Classification Search
CPC .............................. H02K 1/146; H02K 1/276
USPC .................... 310/58, 156.01, 156.53, 156.56
IPC ................................................ H02K 1/14,1/27
See application file for complete search history.

(56) References Cited

U.S. PATENT DOCUMENTS

| 5,151,017 A | 9/1992 | Sears et al. |
| 7,105,971 B2 | 9/2006 | Asai et al. |
| 7,116,065 B2 * | 10/2006 | Wakitani .................. B60K 1/02 318/67 |
| 7,482,724 B2 | 1/2009 | Fujiwara et al. |

(Continued)

FOREIGN PATENT DOCUMENTS

| CN | 2711983 Y | 7/2005 |
| CN | 101487434 A | 7/2009 |

(Continued)

OTHER PUBLICATIONS

Ayman M. El-Rafaie, "Fractional-Slot Concentrated-Windings Synchronous Permanent Magnet Machines: Opportunities and Challenges," IEEE Transactions on Industrial Electronics, vol. 57, No. 1, Jan. 2010, pp. 107-121.

(Continued)

*Primary Examiner* — John K Kim
(74) *Attorney, Agent, or Firm* — Quinn IP Law

(57) ABSTRACT

An interior permanent magnet electric machine includes a stator having a plurality of teeth disposed around a circumference oriented radially towards a center defining slots interposed between each of the teeth, and a conductive winding wrapped around each of the teeth of the stator to receive an electrical current. The electric machine also includes a rotor which is rotatable relative to the stator. The rotor defines a plurality of openings to receive permanent magnets near an outer portion of the rotor and a number of spokes interposed between mass reduction cutouts located closer to the center relative to the permanent magnets. Each of the permanent magnets defines a magnetic pole and each of the spokes is circumferentially aligned with one of the magnetic poles.

8 Claims, 3 Drawing Sheets

(56) References Cited

U.S. PATENT DOCUMENTS

| | | |
|---|---|---|
| 8,541,919 B2 | 9/2013 | Lokhandwalla et al. |
| 9,121,380 B2 | 9/2015 | Fulton |
| 9,567,922 B2 | 2/2017 | Lofgren |
| 2002/0153796 A1* | 10/2002 | Yoshinaga .............. H02K 21/14 310/156.48 |
| 2003/0048024 A1* | 3/2003 | Chu ....................... H02K 1/276 310/156.45 |
| 2003/0183430 A1* | 10/2003 | Naito ..................... B60K 6/485 180/65.26 |
| 2003/0189375 A1 | 10/2003 | Raad |
| 2005/0140235 A1* | 6/2005 | Yamagishi ............. H02K 1/276 310/156.53 |
| 2005/0236246 A1 | 10/2005 | Joki |
| 2007/0018522 A1* | 1/2007 | Ackva ................... H02K 1/276 310/156.46 |
| 2008/0079389 A1 | 4/2008 | Howell et al. |
| 2008/0193275 A1* | 8/2008 | De Filippis ............ H02K 1/276 415/10 |
| 2008/0203846 A1* | 8/2008 | Hoemann .............. H02K 17/12 310/216.004 |
| 2009/0085418 A1* | 4/2009 | Kobayashi ............. H02K 3/522 310/66 |
| 2009/0179518 A1* | 7/2009 | Tajima ................. H02K 1/2766 310/216.055 |
| 2011/0009235 A1 | 1/2011 | Song et al. |
| 2011/0068652 A1 | 3/2011 | Qin et al. |
| 2011/0267851 A1 | 11/2011 | Nagel et al. |
| 2012/0025601 A1 | 2/2012 | Nefcy et al. |
| 2012/0053011 A1 | 3/2012 | Onomura et al. |
| 2013/0038271 A1 | 2/2013 | Park |
| 2013/0106219 A1* | 5/2013 | Schneider ................ H02K 5/16 310/89 |
| 2013/0138328 A1 | 5/2013 | Shimo et al. |
| 2013/0154397 A1 | 6/2013 | Sullivan |
| 2013/0300371 A1 | 11/2013 | Bills |
| 2014/0015364 A1* | 1/2014 | Iwatsu ................. H02K 1/2766 310/156.53 |
| 2014/0091664 A1 | 4/2014 | Aoyama |
| 2014/0292073 A1* | 10/2014 | Zhang ..................... B60R 16/03 307/9.1 |
| 2015/0105949 A1 | 4/2015 | Wright et al. |
| 2015/0112536 A1* | 4/2015 | Severinsky ............ B60H 1/004 701/22 |
| 2015/0224845 A1 | 8/2015 | Anderson et al. |
| 2015/0239334 A1* | 8/2015 | El Baraka ................ B60K 6/26 310/78 |
| 2015/0283964 A1* | 10/2015 | Janarthanam .......... B60L 11/12 307/9.1 |
| 2015/0295459 A1* | 10/2015 | Hao ....................... B60W 20/10 180/65.26 |
| 2016/0006311 A1 | 1/2016 | Li |
| 2016/0056684 A1* | 2/2016 | Nemoto ................. H02K 21/14 310/51 |
| 2017/0082012 A1 | 3/2017 | Jang |
| 2017/0327106 A1 | 11/2017 | Johri et al. |
| 2017/0334297 A1* | 11/2017 | Hao ........................ B60L 11/18 |
| 2017/0334422 A1 | 11/2017 | Namuduri et al. |
| 2017/0338706 A1 | 11/2017 | Hao et al. |
| 2018/0030944 A1 | 2/2018 | Raad |
| 2018/0258900 A1 | 9/2018 | Namuduri et al. |

FOREIGN PATENT DOCUMENTS

| | | |
|---|---|---|
| DE | 102008040830 A1 | 2/2010 |
| DE | 102011056431 A1 | 6/2013 |
| EP | 0619427 B1 | 10/1994 |
| JP | 2000104650 A | 4/2000 |
| JP | 2003148317 A | 5/2003 |
| JP | 2005-80381 A | 3/2005 |

OTHER PUBLICATIONS

Quanbao Zhou, John Houldcroft, "Cold engine cranking torque requirement analysis," SAE International Inc., 2007, JSAE 20077002.

Hao et al., Utility U.S. Appl. No. 15/811,740, filed Nov. 14, 2017.

Namuduri et al., Utility U.S. Appl. No. 15/452,312, filed Mar. 7, 2017.

Namuduri et al., Utility U.S. Appl. No. 15/961,198, filed Apr. 24, 2018.

Namuduri et al., Utility U.S. Appl. No. 15/961,204, filed Apr. 24, 2018.

Lei Hao et al., Utility U.S. Appl. No. 15/961,176, filed Apr. 24, 2018.

* cited by examiner

PERMANENT MAGNET ELECTRIC MACHINE

TECHNICAL FIELD

The present disclosure related to hybrid vehicle propulsion system electric machine.

INTRODUCTION

Combustion engines may have an electric starter coupled to the engine to turn a crankshaft leading up to a start event. The electric starter can be an electric motor having contact brushes to conduct current between stationary wires on a stator portion and moving parts of a rotor portion. The physical contacts may wear over time leading to motor degradation. Additionally, a brushed motor delivers substantially zero torque near the upper bound of its available speed range.

SUMMARY

An interior permanent magnet electric machine includes a stator having a plurality of teeth disposed around a circumference oriented radially towards a center defining slots interposed between each of the teeth, and a conductive winding wrapped around each of the teeth of the stator to receive an electrical current. The electric machine also includes a rotor which is rotatable relative to the stator. The rotor defines a plurality of openings to receive permanent magnets near an outer portion of the rotor and a number of spokes interposed between mass reduction cutouts located closer to the center relative to the permanent magnets. Each of the permanent magnets defines a magnetic pole and each of the spokes is circumferentially aligned with one of the magnetic poles.

A propulsion system includes a combustion engine and a traction electric machine powered by a high-voltage power source. The propulsion system also includes a starter electric machine selectively coupled to the engine and powered by the high-voltage power source. The starter electric machine includes a stator having a plurality of teeth disposed around a circumference oriented radially towards a center defining slots interposed between each of the teeth and a conductive winding wrapped around each of the teeth of the stator to receive an electrical current. The starter electric machine also includes a rotor which is rotatable relative to the stator. The rotor defines a number of openings to receive permanent magnets near an outer portion of the rotor and a number of spokes interposed between mass reduction cutouts located closer to the center relative to the permanent magnets. Each of the permanent magnets defines a magnetic pole and each of the spokes is circumferentially aligned with one of the magnetic poles.

An interior permanent magnet electric machine includes a stator having a plurality of teeth disposed around a circumference oriented radially towards a center defining slots interposed between each of the teeth and a conductive winding wrapped around each of the teeth of the stator to receive an electrical current. The electric machine also includes a rotor which is rotatable relative to the stator. The rotor is formed from a stack of laminations. The rotor also defines a number of openings to receive permanent magnets near an outer portion of the rotor and at least one air gap interposed between each of two adjacent permanent magnets. A ratio of an outer diameter of the stator to a lamination stack length is between about 1.5 and 3.5.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
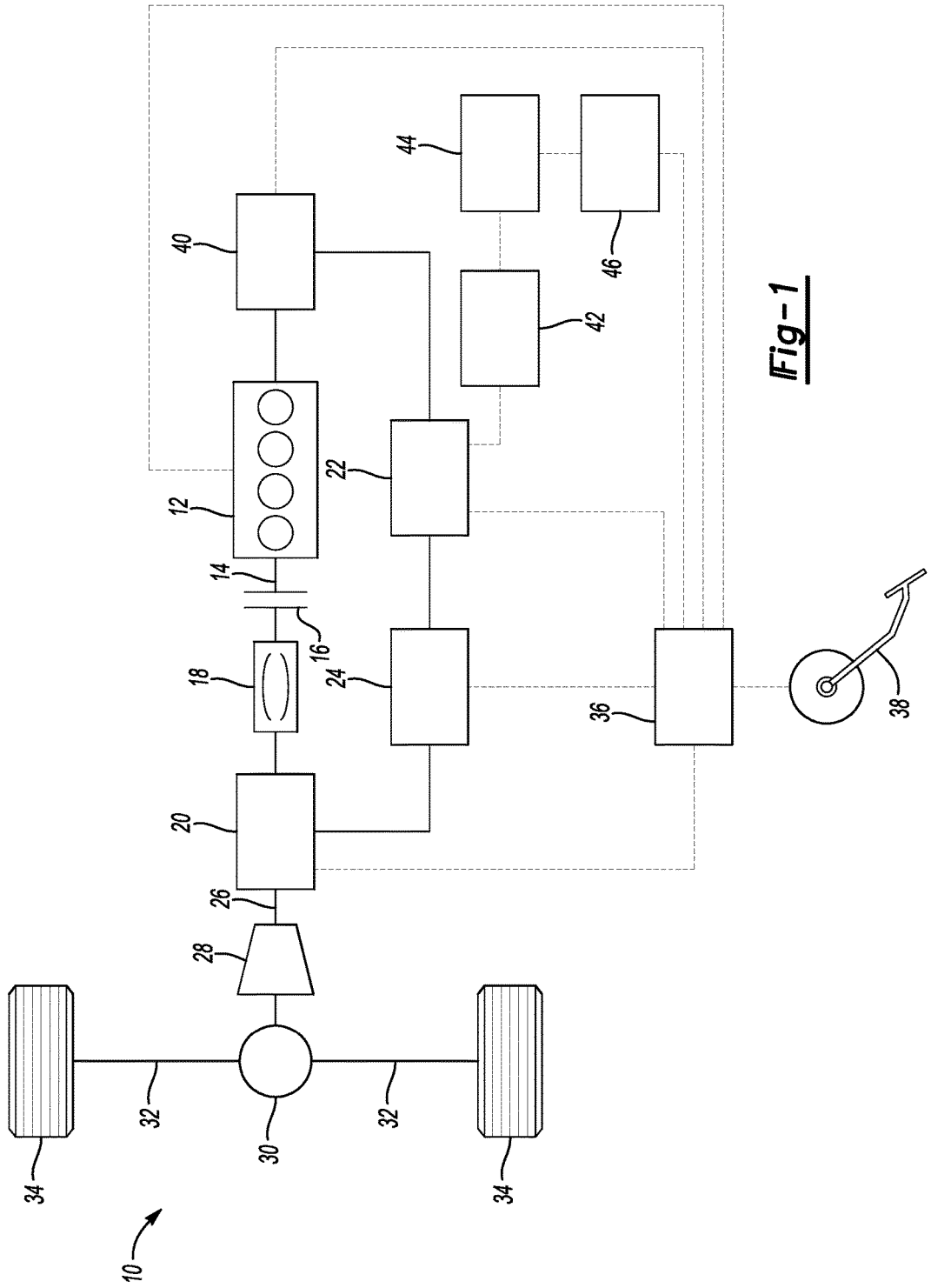
FIG. 1 is a system schematic of a hybrid vehicle propulsion system.

Referring to FIG. 1, a vehicle 10 is provided. By way of example, vehicle 10 is a hybrid electric vehicle (HEV) having a powertrain with both a petrol propulsion source and an electric propulsion source. Either or both of the propulsion sources may be selectively activated to provide propulsion based on the vehicle operating conditions. Internal combustion engine 12 operates as the petrol propulsion source and outputs torque to a shaft 14. The engine 12 may have a plurality of cylinders to generate power from the combustion of a fuel to cause rotation of the shaft 14. One or more decoupling mechanisms may be included along shaft 14 in order to decouple output of engine 12 from the remaining portions of the powertrain. A clutch 16 is provided to allow selection of a partial or complete torque decoupling of the engine 12. In one example clutch 16 is a friction clutch having a plurality of friction plates which are at least partially engaged when the clutch is closed to transfer torque, and disengaged when the clutch is opened to isolate torque flow between the downstream portions of the powertrain and the engine 12.

A torque converter 18 may also be included to provide a fluid coupling between the output portion of engine 12 and downstream portions of the driveline. The torque converter 18 operates to smoothly ramp up torque transfer passed from the engine to the driveline. Also, the torque converter allows a decoupling such that the engine may continue to operate at low rotational speed without causing propulsion of the vehicle (e.g., such as stationary idle conditions).

A first electric machine 20 operates as the electric propulsion source and is powered by a high-voltage traction battery 22. Generally, a high-voltage battery is one that has an operating voltage greater than about 36 volts but less than 60 volts. In one example, the traction battery 22 is a lithium ion high-voltage battery with a nominal voltage of 48 volts. High-voltage direct current is conditioned by an inverter 24 before delivery to the first electric machine 20. The inverter 24 includes a number of switches and a control circuit which operate to convert the direct current into three-phase alternating current to drive the electric machine.

The first electric machine 20 has multiple operating modes depending on the direction of power flow. In a motor mode, power delivered from the high-voltage battery 22 allows the motor to output torque to shaft 26. The output torque may then be transferred through a variable ratio transmission 28 to change the gear ratio prior to delivery to a final drive mechanism 30. In one example the final drive mechanism 30 is a differential configured to distribute torque to one or more side shafts 32 which are coupled to wheels 34. The first electric machine 20 may be disposed either upstream of the transmission 28, downstream of the transmission 28, or integrated within a housing of the transmission 28.

The first electric machine 20 is also configured to operate in a generation mode to convert rotational motion into power to be stored at high-voltage battery 22. When the vehicle is moving, whether propelled by the engine or coasting from its own inertia, rotation of shaft 26 turns an armature, or rotor, (not shown) of the first electric machine 20. The motion causes an electromagnetic field to generate alternating current that is passed through the inverter 24 for conversion into direct current. The direct current may then be provided to the high-voltage battery 22 to replenish the charge stored at the battery. A unidirectional or bidirectional DC-DC converter 42 is used to charge a low-voltage (e.g., 12 volt) battery 44 and supply the low voltage loads 46 such as the conventional 12 volt loads. When a bidirectional DC-DC converter 42 is used, it is possible to jump start the high-voltage battery 22 from the low-voltage battery.

The various propulsion system components discussed herein may have one or more associated controllers to control and monitor operation. Controller 36, although schematically depicted as a single controller, may be implemented as one controller, or as system of controllers in cooperation to collectively manage the propulsion system. Multiple controllers may be in communication via a serial bus (e.g., Controller Area Network (CAN)) or via discrete conductors. The controller 36 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various propulsion system components. The controller 36 is in communication with the engine 12 and receives signals indicative of at least engine speed, temperature, as well as other engine operating conditions. The controller 36 is also in communication with the first electric machine 20 and receives signals indicative of motor speed, torque, and current draw. The controller may also be in communication with battery 22 and receive signals indicative of at least battery state of charge (SOC), temperature, and current draw. The control also receives signals indicative of the circuit voltage across the high-voltage bus. The controller 36 may further be in communication with one or more sensors at a driver input pedals 38 to receive signals indicative of pedal position which may reflect acceleration demand of the driver. The driver input pedal 38 may include an accelerator pedal and/or a brake pedal. In alternative embodiments such as a self-driving autonomous vehicle, acceleration demand may be determined by a computer either on-board or off-board of the vehicle without driver interaction.

As mentioned above, either one or both of the engine 12 and the first electric machine 20 may be operated at a particular time based at least on the propulsion requirements of the vehicle. During high torque demand conditions, the controller 36 may cause both of the engine 12 and the first electric machine 20 to be activated such that each provides an output torque which in combination propel the vehicle 10.

In certain moderate torque required conditions, the engine operates efficiently and may be used as the sole propulsion source. For example, during highway driving with a generally constant speed, the first electric machine 20 may be deactivated such that only the engine 12 provides output torque.

Under other example operating conditions, the engine 12 may be deactivated such that only the electric machine 20 provides output torque. The clutch 16 may be opened to decouple the shaft 14 from the downstream portions of the powertrain. Specifically, during vehicle coast conditions where a driver allows the vehicle to decelerate under its own resistance, the engine may be deactivated and the motor operated in generator mode to recover energy. Additionally, engine deactivation may be desirable during a temporary vehicle standstill such as at a traffic light. Instead of allowing the engine to idle, fuel consumption may be reduced by deactivating the engine while the vehicle is stationary. In both examples, it may be beneficial to rapidly restart the engine in response to a subsequent increase in propulsion demand. A prompt engine startup may avoid roughness and/or latency in power delivery being perceived by a driver.

Vehicle 10 includes a second electric machine 40 that is selectively coupled to the engine 12. The second electric machine 40 operates as a starter motor and when engaged with the engine leading up to a combustion cycle, turns a crank portion of the engine to facilitate a cold start or a restart. The second electric machine 40 may be connected to a flywheel portion of the engine through a geared mechanical connection to pass torque to the crankshaft to start the engine. In another example, the second electric machine 40 may be connected to a crank pulley through a toothed belt mechanical connection to pass torque to the crankshaft of the engine. According to aspects of the present disclosure, the controller 36 is programmed to issue a command to start the engine 12 using the second electric machine 40 in response to an acceleration demand following a period of reduced acceleration demand.

The second electric machine 40 is selectively engageable to the engine through a sliding pinion gear within an electric machine housing. A first solenoid may be disposed to actuate the pinion gear from a first disengaged position to a second position that is in mechanical connection with the engine crankshaft to transfer torque. As discussed above there may be different configurations of intermediate components to provide gear ratio adjustments and/or geometric adjustments due to powertrain package constraints. The first solenoid may receive a signal to engage the pinion gear once the electric machine is at a suitable speed for smooth torque transfer to start the engine.

When the engine is restarted, it may be restarted from substantially zero rotational speed, or from a speed which is significantly less than the rotational speed of the downstream powertrain components such as the first electric machine 20. The controller 36 may implement a delay following the initial restart of the engine 12 to allow engine speed to ramp up to be within a predetermined range of the system speed prior to closing the clutch 16. Reducing the difference between engine speed and speed of the downstream components improves the smoothness of the engagement of the clutch 16 and reduces NVH perceived by a passenger related to the engine restart event. However, this delay may lead to a perceivable lag in the delivery of additional propulsion torque required from the engine.

Some powertrain systems may include a brush contact type of starter motor coupled to the engine to provide the startup function. The starter motor is commonly powered by a low-voltage battery connected over a low-voltage bus. It may be powered by low-voltage battery 42 for example, or by a supplemental low-voltage power source. Conventional low-voltage batteries typically have a nominal voltage of about 12 volts and generally less than 18 volts. Low voltage loads 46 such as vehicle accessories are also commonly powered over the same low-voltage bus.

It may be undesirable to keep a brushed contact starter motor connected to the power source on an ongoing basis. Therefore brushed contact starter motor systems commonly include a second solenoid to actuate a mechanical connection to an electrical terminal to provide power. When it is desired to start the engine, the first solenoid and second solenoid must both be actuated. In many instances the actuation must be performed sequentially. For example, the second solenoid may be actuated to provide power to allow the starter motor to build up rotational speed. Then the first solenoid may be actuated to mechanically engage the starter motor output to the engine to facilitate the start event. Such a sequential actuation of multiple solenoids to operate the starter motor may contribute to an undesirable time delay for an engine restart.

When the engine is started, a temporary voltage drop is caused by the power load of the starter motor. A passenger may perceive certain symptoms such as lamp illumination levels dropping or temporary degraded function of other electrically-powered accessories due to the voltage drop. To avoid such undesirable symptoms, compensation means may be used but may have disadvantages. For example an additional DC-DC boost converter may be provided to temporarily step up the voltage to mask potential symptoms related to a voltage drop caused by the starter motor. Alternatively, a second power source may be provided to supplement the battery and compensate for a voltage drop. Each of the above examples of a voltage drop compensation means may increase cost, weight, and complexity of the propulsion system.

The brush contact type of motor may also be inherently limited in the time required to start the engine. Related to the construction of the brush contact motor, windings affixed to the rotor increase both the size and the mass of the rotor. The additional rotational inertia of the rotor may cause a higher duration of time to reach a desired rotational speed from rest. This adds to the duration of the engine restart and subsequently may limit the responsiveness of the propulsion system.

According to an aspect of the present disclosure, the second electric machine 40 is a brushless permanent magnet DC motor coupled to the engine 12 to provide a starting torque to restart the engine 12. The second electric machine 40 is powered by the high-voltage traction battery 22 over the high-voltage bus. The high-voltage operation of the second electric machine 40 provides rapid engine restarts that enable quick acceleration following engine deactivation during coasting for example.

Operating the second electric machine 40 over the high-voltage bus eliminates the need for a boost converter to stabilize the voltage in the circuit due to power draw. The second electric machine is powered by the same power source as the traction motor, or first electric machine 20. Utilizing a single high-voltage power source also avoids the need for a supplemental power source to mitigate voltage drops caused by starter operation. Further, by powering the second electric machine over the separate high-voltage bus, electrical isolation may be achieved between the engine starting function and other vehicle accessory functions.

The brushless electric machine may be any of a number of known motor types such as a surface permanent magnet machine, an internal permanent magnet machine, a drag-cup induction machine, or a switched reluctance machine for example. Brushless motors provide the additional benefit of increased duration of usable life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output. According to aspects of the present disclosure, the output speed of the second electric machine is synchronized with the speed of the engine to reduce noise, vibration, and harshness (NVH) which may occur during a restart event.

Brushless electric machine 40 may also include at least one integrated circuit which is programmed with control logic to perform electronic commutation as opposed to physical contacts employed by a brush motor. The electronic commutation may be achieved by a plurality of solid-state switches (e.g., MOSFET, IGBT type transistors) included within a housing of the electric machine. The switches are independently and selectively connectable to the high-voltage power source. Multiple stages of a commutation sequence are achieved by activating the switches in a sequence to create a rotating electric field within the electric machine. Based on selection of particular switches and the rate of actuation, the speed and the output torque of the motor may be precisely controlled. In this way, a separate inverter may not be required to convert direct current from the high-voltage battery 22 into three-phase alternating current to drive the electric machine 40. The electric machine 40 may also include internal sensors (e.g., Hall effect sensors) to detect the position and speed of the motor. This position feedback may be used to input the control logic to influence the actuation of the solid-state switches. The control logic may also include protection against undesirable motor conditions such as overcurrent, short-circuit, and thermal overheating. The integrated circuit may be programmed to execute a control action in response to detection of one or more error conditions of the motor.

The integrated circuit as discussed above may eliminate the need for a dedicated solenoid to engage and disengage the electrical connection between the second electric machine and the power source. The internal solid-state switches may be used to electrically isolate the electric machine from the power source without mechanical actuation of a solenoid. According to aspects of the present disclosure, the starter electric machine is provided with a single solenoid actuator to selectively couple the second electric machine to the engine, and the second electric machine is connected to the high-voltage battery via the solid-state switches. No solenoid is provided to achieve an electrical connection to the power source.

By using a brushless electric machine the inertia of the rotor may be significantly reduced. The windings are located on the stator thereby reducing the mass of the rotor. For example, a center portion of the rotor may be configured to be hollow to provide mass reduction. Further, permanent magnets of the rotor may be inset relative to an outer surface of the rotor to position the magnets closer to the axis of rotation of the rotor. In one example, the brushless electric machine may have an inertia value of about 48 kg-mm$^2$. Comparatively, brushed motor rotors are generally heavier and have a larger diameter relative to a brushless configuration. In a similar engine starter application using a brushed motor, the rotor inertia may be as much as five times greater. In one example, the rotor inertia of a brushed motor engine starter is about 241 kg-mm$^2$. The combination of the reduced inertia of the electric machine and high power output over a high speed range (e.g., 5,000-16,000 RPM) enables a faster wind up of the electric machine, and thus a more rapid engine restart.

Figure 2:
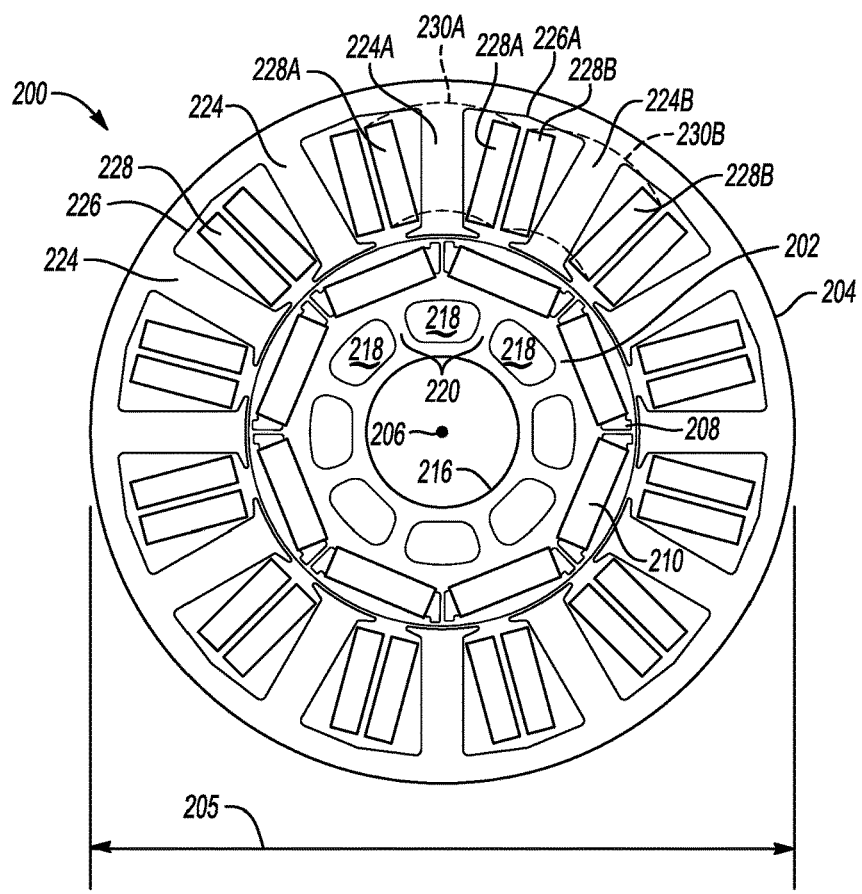
FIG. 2 is a cross-sectional view of an electric machine.
Figure 3:
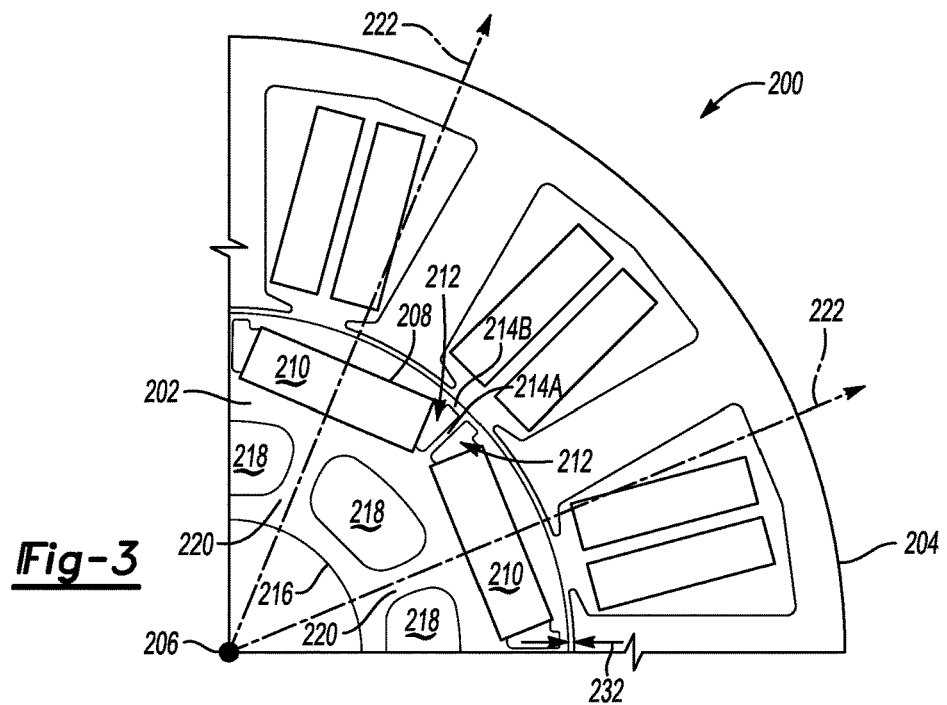
FIG. 3 is an enlarged sectional view of the electric machine of FIG. 2.

Referring collectively to both FIG. 2 and FIG. 3, a cross-section of a brushless permanent magnet electric machine 200 includes a rotor 202 and a stator 204. The stator is generally cylindrical in shape, and defines a hollow central portion to receive the rotor 202. According to at least one example, the outer diameter 205 of the stator 204 is limited to be no greater than 80 millimeters. The rotor 202 is configured to rotate relative to the stator 204 about axis of rotation 206. The rotor 202 may be formed in layers, or laminations, which are stacked in an axial direction along the axis of rotation 206 where the lamination stack defines an active length of the electric machine 200. According to one example, the lamination stack length is limited to be no greater than 40 millimeters. The overall size of the electric machine 200 may be limited related to engine package constraints such that a ratio of the outer diameter of the stator 204 to the lamination stack length is between about 1.5 and 3.5.

The rotor 202 includes a plurality of openings 208 disposed near a perimeter portion of the rotor. Each of the openings 208 is configured to hold a permanent magnet 210. The openings are sized to enhance manufacturability, for example having an opening width of at least about 2 millimeters. The plurality of permanent magnets 210 may be formed from a type of iron-based alloy, such as neodymium, and cooperate to generate a magnetic field which interacts with the stator when energized to cause movement of the rotor 202. In one example, each of the permanent magnets 210 is rectangular in shape to enhance simplicity and reduce manufacturing costs. However, other magnet shapes may be suitable according to the present disclosure.

The permanent magnets 210 are arranged to create number of magnetic poles around the rotor 202. Each of the permanent magnets 210 is affixed within one of openings 208 of the rotor 202 and functions as a magnetic pole of the rotating electric machine. Magnetic flux is generated in a direction normal magnet body. Each permanent magnet 210 is oriented to have an opposing direction of polarity with respect to adjacent magnets in order to generate magnetic flux in opposite directions. In the example of FIG. 1, there are 8 permanent magnets 210, and therefore 8 poles created by the magnet arrangement. In alternative examples, the number of poles may be smaller or greater, for example between 4 and 14 poles.

The openings 208 of the rotor are shaped to include air gaps 212 on either side of each permanent magnet 210. The air gaps 212 between each pole size of are sized to reduce flux leakage between the magnetic poles of the rotor. A bridge 214A separates each of two adjacent air gaps 212. A bridge portion 214B holds the outer portion of the rotor lamination to be a single piece. It may be desirable to configure the bridge portions 214A and 214B to be as thin as possible to maximize the size of the flux barrier created by the air gaps 212. At the same time, the bridge portions 214A and 214B must be thick enough to have sufficient strength to maintain structural integrity of the rotor 202 when the permanent magnets 210 are subject to magnetic and centrifugal forces during operation. In the example of FIG. 2 and FIG. 3, the thickness of bridges 214A is between about 0.5 millimeters and 1.5 millimeters. The thickness of bridge portions 214B is between about 0.5 millimeters and 1 millimeter.

The rotor 202 also defines a shaft interfacing portion 216 near the axis of rotation 206. The shaft interfacing portion 216 engages an output shaft of the motor (not shown) for transferring torque between the motor 200 and a crankshaft of the engine, for example during an engine start event. The shaft interfacing portion 216 is depicted as generally round, but alternative shapes may be employed such as asymmetric openings and/or keyed features to transfer torque between the rotor 202 and an output shaft.

The rotor 204 further includes a number of mass reduction cutouts 218 in low flux density areas near the center of the rotor 202 to reduce overall mass, as well as reduce the rotational moment of inertia. Between each of the mass reduction cutouts 218, a spoke 220 connects the shaft interfacing portion 216 to the outer portion of the rotor 202 which contains the permanent magnets 210. Each of the spokes 220 are aligned with a direct axis 222 ("D-Axis") of the rotor. That is, the spokes 220 are located along the magnet poles of the rotor 202.

The rotor is caused to rotate when the stator 204 is energized. The stator includes a plurality of teeth 224 arranged radially about a circumference of the stator 204. Each of the teeth 224 are spaced to define an axially-extending slot 226 between two adjacent teeth 224. The teeth 224 and slots 226 are referred to collectively when it is unnecessary to distinguish particular individual teeth or slots from one another. The slots 226 are generally trapezoidal in shape, and provide space for conducting coils to be wound about each of the teeth 224. In the example provided, 12 teeth are provided defining 12 slots to accept stator windings. In other examples, the number of teeth and slots may be smaller or greater, for example between 6 and 18 teeth and slots.

A number of windings 228 are provided to wrap about each of the teeth 224 and are configured to generate a rotating magnetic field within the stator 204. The windings 228 are referred to collectively when unnecessary to distinguish particular individual windings from one another. The windings 228 are depicted as a single block, however each block represents a group of loops, or turns, of individual conducting wire strands. The wire stands may be basic cylindrical copper wire having gaps between each wire limiting the fill efficiency of the windings filling the area of each slot 226. Alternatively, the wire strands may be pressed together or have alternatively-shaped cross sections to reduce gaps and improve the fill efficiency of the windings which fill the slots 226. In the example of FIG. 2, the windings 228 are arranged in a fractional concentrated arrangement. That is, the windings are non-overlapping, or concentrated, such that each of the teeth 224 are individually wrapped by coil. In the example of FIG. 2, double layer windings are employed such that all of the teeth 224 are wound by coil. This causes multiple winding paths within each slot 226. By way of illustration, winding 228A wraps about tooth 224A such that a portion of winding 228A is on either opposing side of tooth 224A. Dashed lines 230A indicate a routing path of the winding 228A over an end portion of tooth 224A. Similarly, winding 228B wraps about tooth 224B such that a portion of winding 228B is on either opposing side of tooth 224B. Dashed lines 230B indicate a routing path of the winding 228B over tooth 224B. The double layer winding illustrated by FIG. 2 is arranged such that both of winding 228A and 228B concurrently occupy slot 226A while wrapping the adjacent teeth 224A and 224B, respectively. The configuration of windings 228 relative to teeth 224 is uniform about a circumference of the stator 204.

The electric machine 200 is driven when a number of the windings 228 are sequentially powered to create a rotating electromagnetic field. As discussed above, the motor 200 may include a circuit to convert high-voltage direct current into three-phase alternating current to operate the motor 200. Each of the three phases are activated at a sequenced timing to cause an electromagnet force to drive the rotor 202 to rotate relative to the stator 204. The motor circuit may also include Hall sensors to detect the angular position and speed of the rotor 202. Pulse width modulation (PWM) is used to open and close each of a plurality of switches to simulate an alternating current on each of three circuits. The three circuits are powered to have staggered phases such that the electromagnetic field urges the rotor to rotate in a desired direction and speed. The permanent magnets 210 mounted on the rotor 202 interact with the current-induced magnetic fields caused by electrical input to the stator 204.

An air gap 232 extends circumferentially around an outer portion of the rotor 202 and mechanically isolates the rotor 202 from the stator 204. The air gap 232 influences the power factor of the motor 200. The power factor may be defined as a ratio of real power to apparent power and indicates the percentage of useful energy from the total energy. As power is transferred through the motor, it is not purely real power that can do work once transferred to the load, but rather includes a combination of real power and apparent power (also referred to as reactive power). The power factor describes the amount of real power transmitted through the motor relative to the total apparent power flowing through the motor. An overall power factor less than 1 may indicate that the power supply may be providing more capacity than actually required and characterize certain power losses. The power factor may also vary based on the power input and load upon the electric machine. The air gap 232 influences the reluctance between the stator and the rotor, which affects the required magnetizing current for production of flux between the stator and the rotor for a given supply voltage. The air gap 232 is reduced to the smallest possible gap while accounting for component dimensional tolerances and deflection of the rotor 202 in order to avoid mechanical contact between the rotor 202 and the stator 204 during operation. In at least one example, the air gap is between about 0.2 millimeters to 0.7 millimeters to maximize the power factor.

Figure 4:
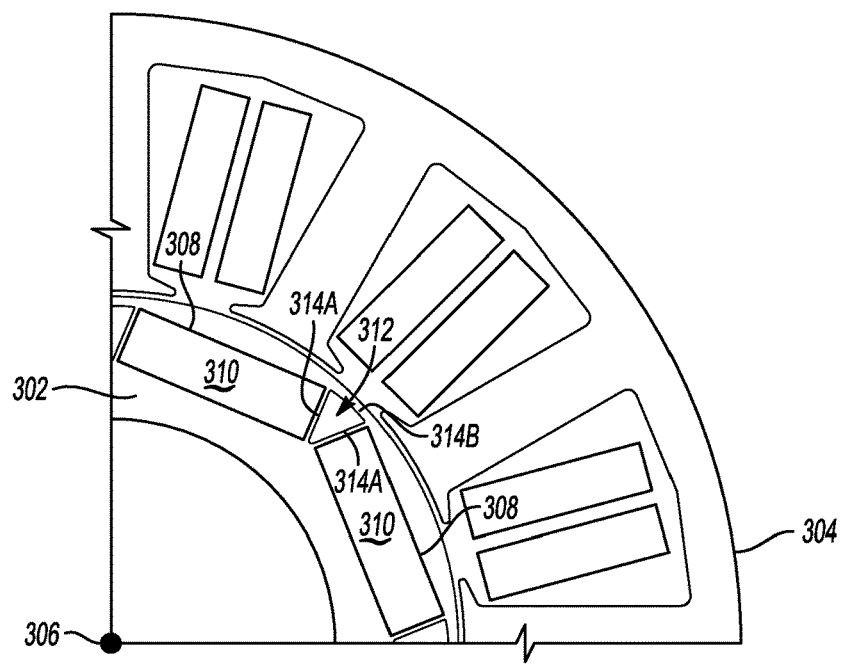
FIG. 4 is a sectional view of an alternate embodiment electric machine.

Referring to FIG. 4, an alternate configuration of rotor 302 for an electric machine is presented. A similar numbering convention is used for components which correspond to similar component of previous examples discussed above. The rotor 302 includes an additional example configuration of air gaps and bridges relative to examples discussed above.

A single air gap 312 is disposed between two adjacent permanent magnets 310. On either side of each air gap 312, a pair of bridges 314A extend radially outward towards an outer portion of the rotor 302. Openings 308 each hold a permanent magnet 310 and are shaped to conform to an outer perimeter shape of a respective magnet. Thus, each of the bridges 314 may be located along an edge of a permanent magnet 310 and define a gap which diverges as the bridges extend radially outward. A bridge portion 314B holds the outer portion of the rotor lamination to be a single piece. The air gap 312 operates to reduce flux leakage between the permanent magnets 310 similar to previous examples. Since there is a pair of bridges 314A between each pole connected by bridge portion 314B to accommodate service loads related to magnetic and centrifugal forces, the material thickness of each individual bridge portion 314A and 314B may be thinner relative to previously-discussed examples having a single bridge. In the example of FIG. 4, the thickness of bridge portions 314A and 314B is between about 0.5 millimeters and 1.0 millimeters.

Figure 5:
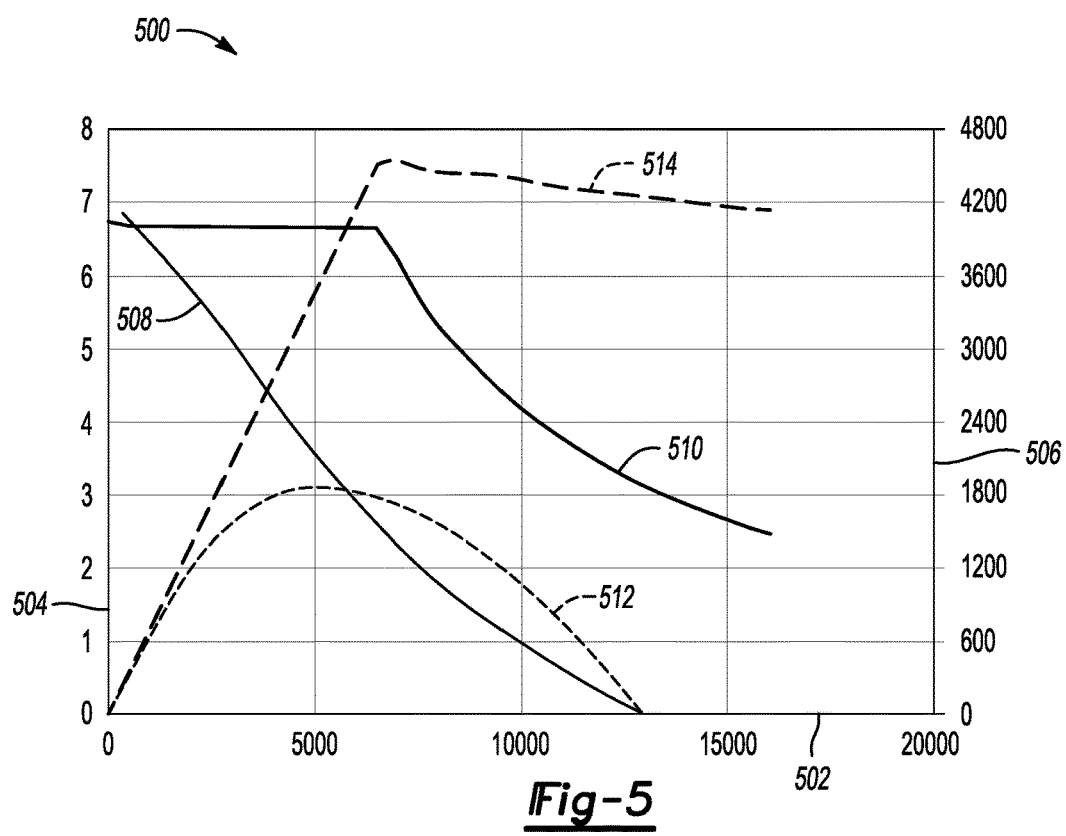
FIG. 5 is a plot of electric machine output.

Referring to FIG. 5, a plot 500 depicts output of a pair of electric machines according to aspects of the present disclosure. Horizontal axis 502 represents rotational speed in rotations per minute (RPM). The left side vertical axis 504 represents output torque of the electric machines in Newton-meters (N-m). The right side vertical axis 506 represents output power of the electric machines in Watts. Each of torque and power are plotted for both a brushed motor and a novel brushless motor according to certain parameters discussed above. Curve 508 represents an output torque profile for a brushed motor. Curve 510 represents output torque profile for a brushless electric machine. It may be seen by comparison that aspects of the present disclosure provide a wider range of relatively constant output torque. For example, between about 0 and 7000 RPM, the brushless motor configuration is capable of outputting relatively constant torque at about 6.7 N-m. In contrast the brushed motor torque profile is generally linear in this range having a negative slope and in the lower RPM ranges outputs significantly less torque. Further it may be seen that the output torque of the brushed motor depicted by curve 508 drops to zero at about 12,500 RPM, whereas the output torque of the brushless configuration represented by curve 510 provides higher torque output for higher RPM ranges. For example the electric machine provided according to aspects of the present disclosure outputs about 2.5 N-m as high as 16,000 RPM.

Power output is also significantly improved according to aspects of the present disclosure. Curve 512 represents an output power profile for a brushed motor and curve 514 represents an output power profile for a brushless electric machine according to the present disclosure. It may be seen by a comparison between curves 512 and 514 that the brushless electric machine configuration is capable of outputting higher power levels, for example around 4,500 Watts. Additionally, the power output of the brushed electric motor decreases to zero at about 12,500 RPM, while relatively constant power is able to be output from the brushless electric machine at significantly higher speeds. For example the brushless electric machine is capable of delivering around 4,200 Watts output as high as 16,000 RPM.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A propulsion system comprising:
   a combustion engine;
   a greater than 36 volts but less than 60 volts power source used to supply a traction electric machine; and a starter electric machine selectively coupled to the engine for a restart and powered by the greater than 36 volts but less than 60 volts power source, the starter electric machine including:
   a stator having a plurality of teeth disposed around a circumference oriented radially towards a center defining slots interposed between each of the teeth,
   a conductive winding wrapped around each of the teeth of the stator to receive an electrical current, and
   a rotor rotatable relative to the stator, the rotor defining a number of openings to receive permanent magnets near an outer portion of the rotor and a number of spokes interposed between mass reduction cutouts located closer to the center relative to the permanent magnets, wherein each of the permanent magnets defines a magnetic pole and each of the magnetic poles is circumferentially aligned with one of the spokes.

2. The engine starter system of claim 1 wherein the starter electric machine is selectively coupled to a flywheel of the engine to provide a cranking torque for an engine restart.

3. The engine starter system of claim 1 further comprising a controller programmed to synchronize a speed of the starter electric machine with a speed of the engine prior to engaging the starter electric machine of the engine.

4. The engine starter system of claim 1 wherein the starter electric machine is configured to be powered by the same greater than 36 volt power source as the traction electric machine.

5. The engine starter system of claim 1 wherein a ratio of an outer diameter of the stator to a lamination stack length is between about 1.5 and 3.5.

6. The engine starter system of claim 1 wherein an outer diameter of the stator is less than about 80 millimeters.

7. The engine starter system of claim 1 wherein a total number of magnetic poles is from 4 to 14 and a total number of slots of the stator is from 6 to 18.

8. The interior permanent magnet electric machine of claim 1 wherein each of the number of openings defined by the rotor is shaped to include air gaps on two sides of the respective permanent magnet, the rotor additionally including a first bridge portion configured to separate each of two adjacent air gaps and a second bridge portion configured to hold the outer portion of the rotor lamination to be a single piece.

* * * * *